United States Patent [19]
Konsella et al.

[11] Patent Number: 5,729,666
[45] Date of Patent: Mar. 17, 1998

[54] EFFICIENT METHOD AND APPARATUS FOR DOWNLOADING OF FONTS FROM A PROCESSOR TO A PRINTER

[75] Inventors: Shane Konsella; Chris R. Gunning, both of Boise, Id.

[73] Assignee: Hewlett-Packard Company, Palo Alto, Calif.

[21] Appl. No.: 692,662

[22] Filed: Aug. 5, 1996

[51] Int. Cl.$^6$ .................................................. G06K 15/00
[52] U.S. Cl. .......................................... 395/110; 395/114
[58] Field of Search ........................................ 395/110, 114, 395/115, 117, 101, 167, 171, 172, 885, 892, 894; 400/70, 71, 76; 358/470

[56] References Cited

U.S. PATENT DOCUMENTS 5,469,533  11/1995  Pennis ................................. 395/114
5,579,449  11/1996  Strobel ................................ 395/110

*Primary Examiner*—Arthur G. Evans

[57] ABSTRACT

A data processing configuration includes a computer, a printer and a font memory which houses tables that define spacing metrics that are individual to each glyph included in a font. The computer is connected to the font memory and further includes a printer driver function which is controllable to download glyph data to the printer in response to an output from an application, running on the computer, which specifies a requirement that a glyph is to be printed by the printer. The computer is responsive to a download requirement to derive from the font memory, header data for transmission to the printer. The downloaded header data excludes the spacing metrics that are individual to each glyph of the font. Thereafter, the printer driver downloads required font glyph data by transmitting data structures to the printer which include, among other data elements, the spacing metrics that are individual to the specific glyph being transmitted. In such manner, spacing metrics are transmitted to the printer only with a particular associated glyph and only when that glyph is required at the printer, thereby reducing data transfer times and making more efficient use of printer memory.

8 Claims, 1 Drawing Sheet

EFFICIENT METHOD AND APPARATUS FOR DOWNLOADING OF FONTS FROM A PROCESSOR TO A PRINTER

FIELD OF THE INVENTION

This invention relates to a method and apparatus for downloading of outline-style fonts from a host processor to a printer and, more particularly, to a downloading method which enables more efficient use of printer memory and avoids storage of data in the printer which is not required for downloaded font characters.

BACKGROUND OF THE INVENTION

Data transfer time and memory usage are parameters which substantially affect printer performance. Host processors often store fonts in the form of contour and outline descriptions that are commonly known as "TrueType" fonts (a trademark of the Apple Corp). A TrueType font glyph takes the form of data which describes the outline and contour of the glyph and may include one or more Bezier functions. When a TrueType font glyph's data is output from a font memory, the host processor will either convert the font data directly to a raster image of the glyph or will transfer the font glyph data directly to the printer (where it will be rendered into a raster image).

FIG. 1 illustrates the overall structure of a processor/printer configuration wherein a TrueType file 10 is enabled to download font glyph data to a host processor 12 which, in turn, instructs a printer driver 14 to transmit the font glyph data to printer 16. In processors which employ the Windows operating system (a trademark of the Microsoft Corporation), a printer driver 14 in host processor 12 keeps track of which fonts and glyphs have been downloaded to printer 16. Thus, when an application running on host processor 12 issues a document for transmission to printer 16, the document specifying a font that is not resident in printer 16, printer driver 14 initiates a routine which results in a downloading of the required font to printer 16.

Presently, when a TrueType font glyph is first downloaded, a font header is initially transmitted to printer 16 and specifies overall font data parameters. A schematic representation of a TrueType font header is shown in FIG. 2(a) and comprises a number of segments which provide the necessary data to enable printer 16 to properly render the font's glyphs. Page description language (PDL) data segment 16 contains a font identifier, a vendor identifier, a style identifier (e.g. italic, bold, . . . etc.), whether the font is condensed or not condensed, font metrics, size of tables contained in the font header, etc., etc.

A further segment of the font header, called Global TrueType (GT) data 20, contains plural tables that designate parameters for each glyph in the font. A table "hhea" provides instructions as to how to interpret a further table i.e., an "hmtx" table. The "hmtx" table provides, for each font glyph, an "advance width" parameter and a "left side bearing" value. The advance width parameter indicates the distance to advance to arrive at a next glyph position. The left side bearing value indicates how far to the right a glyph should be positioned from a previous glyph to obtain a desired white space effect.

If a Latin font is being utilized, the amount of memory required for the "hhea" and "hmtx" tables is not significant in the overall context of memory usage. However, if glyphs of an Asian font are to be transmitted to the connected printer, the size of the "hhea" and "hmtx" tables can become quite large and the simple act of transferring the font header to the printer can require a substantial data transfer time. Further, the memory requirements to store the header data become large.

In addition to the font header shown in FIG. 2a, a TrueType file includes a table of glyph data which includes, for each glyph, a glyph identifier and the actual glyph data which describes the contour of the glyph. The data is repackaged into a buffer whose format is identified by format and class fields. A format field indicates whether the glyph is in outline or bitmapped form and the class field indicates the particular data structure utilized to define the glyph. There is one buffer entry, such as shown in FIG. 2b, for each glyph in the font.

Printer Control Language (PCL), a widely used printer control language, is currently used by printer drivers to download a TrueType font header in the format shown in FIG. 2a. The glyph data, per se, is not downloaded until a specific demand is made for a glyph, at which time the glyph I.D., format/class and glyph data for the required glyph are transmitted to the printer. Thus, the printer only receives glyph data for a particular print job then in process. While this procedure eliminates the downloading of unneeded glyph data, the downloading of the font header and the associated "hhea" and "hmtx" tables increases the required data transfer time and places unnecessary memory requirements on the printer.

Accordingly, it is an object of this invention to provide a method and apparatus for downloading of outline-style fonts which enables more efficient memory usage and reduced data transfer times.

It is another object of this invention to provide an improved method for downloading of TrueType fonts wherein individual font glyph metric data is only downloaded when needed for the rendering of a particular font glyph.

SUMMARY OF THE INVENTION

A data processing configuration includes a computer, a printer and a font memory which houses tables that define spacing metrics that are individual to each glyph included in a font. The computer is connected to the font memory and further includes a printer driver function which is controllable to download glyph data to the printer in response to an output from an application, running on the computer, which specifies a requirement that a glyph is to be printed by the printer. The computer is responsive to a download requirement to derive from the font memory, header data for transmission to the printer. The downloaded header data excludes the spacing metrics that are individual to each glyph of the font. Thereafter, the printer driver downloads required font glyph data by transmitting data structures to the printer which include, among other data elements, the spacing metrics that are individual to the specific glyph being transmitted. In such manner, spacing metrics are transmitted to the printer only with a particular associated glyph and only when that glyph is required at the printer, thereby reducing data transfer times and making more efficient use of printer memory.

DETAILED DESCRIPTION OF THE INVENTION

Briefly stated, the invention removes from the font header, spacing metrics relating to individual glyphs and inserts that data into the associated glyph data structures. Thus, when such a glyph data structure is transferred to the printer, it carries with it the spacing metric data with the glyph data.

Figure 1:
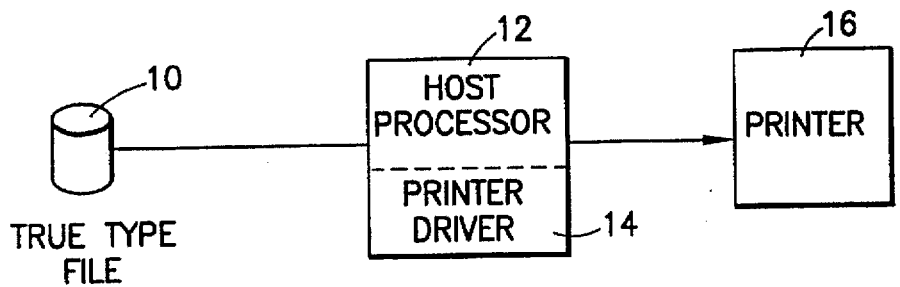
FIG. 1 is a high level block diagram showing a host processor/printer arrangement for implementing the invention.
Figure 2A:
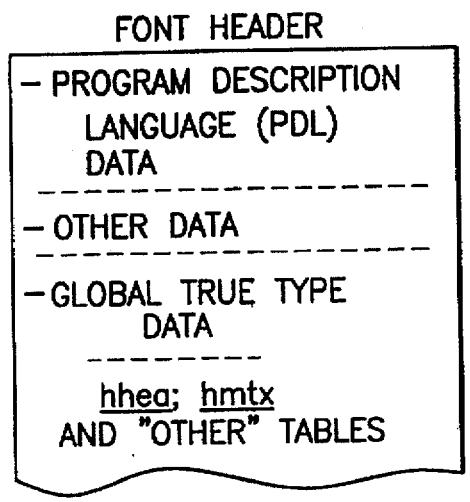
FIG. 2a is a schematic of data contained in a prior art font header.
Figure 2B:
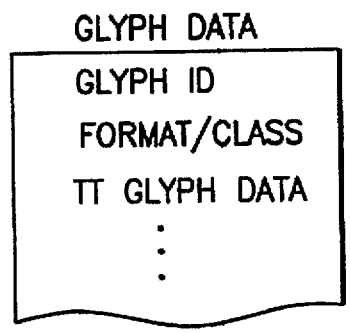
FIG. 2b is a schematic of data contained in a prior art glyph data structure.
Figure 3A:
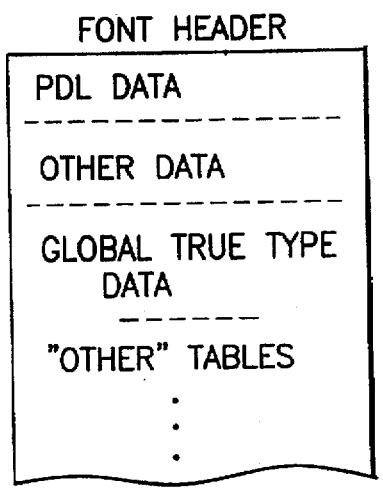
FIG. 3a is a schematic of a font header employed by the invention.

As shown in FIG. 1, TrueType file 10 still provides to host processor 12 a font header such as shown in FIG. 2a. However, in lieu of transmitting the "hhea" and "hmtx" tables along with the font header to printer 16, host processor 12 inhibits transfer of those tables and transmits a font header of the form shown in FIG. 3a. Except for the exclusion of the hhea and hmtx tables, the font header table of FIG. 3a is identical to that of FIG. 2a.

Figure 3B:
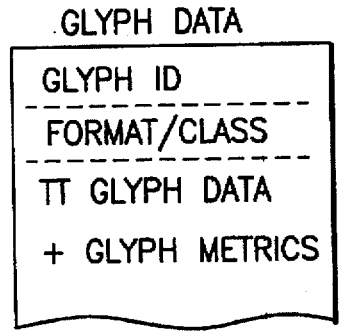
FIG. 3b is a schematic of a glyph data structure utilized by the invention.

As each new glyph requirement is placed upon printer driver 14, the relevant spacing metrics from the "hmtx" table in host processor 12 are associated with the requested glyph data structure and are transmitted to printer 16. More specifically, as shown in FIG. 3b, each glyph data structure that is transmitted to printer 16 includes a left side bearing value and an advance width value (i.e., spacing metrics). When printer 16 receives the glyph data structure, the metrics are extracted and employed to determine proper placement in a raster buffer of the raster image which corresponds to the specific glyph. At this point, the raster image is ready for printing.

A benefit of this arrangement is that the entire "hhea" table is not needed in printer 16, as printer 16 never receives the "hmtx" table. Printer 16 only receives spacing metrics for a glyph when the respective glyph is received from host processor 12. No longer is printer 16 required to allocate memory for storage of the "hhea" and "hmtx" tables.

When certain Oriental fonts are written in a top to bottom fashion on the page, the TrueType font header further includes "vhea" and "vmtx" tables. The "vmtx" table provides vertical spacing metrics for the Oriental font glyphs. If the TrueType font being considered is such an Oriental font, then the "vmtx" table is handled identically to the "hmtx" table described above. In other words, a respective metrics contained therein are only transmitted to printer 16 when an Oriental glyph, which is associated with the metrics, is transmitted.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A data processing apparatus comprising:
    a font memory including font header data which includes data which defines spacing metrics for each glyph stored in said font memory;
    a printer; and
    a host processor coupling said font memory to said printer and further including printer driver means for enabling communications with said printer, said printer driver means downloading said font header data to said printer when a first glyph of a corresponding font is downloaded thereto, said font header data excluding said data which defines spacing metrics except for said first glyph and, in response to a requirement to download a further selected font glyph to said printer, downloading a glyph data structure corresponding to said further selected font glyph, said glyph data structure including said spacing metric data for only said further selected font glyph.

2. The data processing apparatus as recited in claim 1, wherein said spacing metric data comprises left side bearing and advance width data.

3. The data processing apparatus as recited in claim 3, wherein said font header data is devoid of left side bearing and advance width data for glyphs comprising said font.

4. The data processing apparatus as recited in claim 1, wherein said font memory stores TrueType font data which comprises contour descriptions of font glyphs.

5. A method for downloading font data from a host processor to a printer, said host processor including a font memory for storing font header data which includes data which defines spacing metrics for each glyph in a font, said host processor further including printer driver means for enabling communications between said host processor and said printer, said method comprising the steps of:
    a) responding to a requirement to download a first glyph of a selected font to said printer, by
        i) downloading font header data, excluding said data which defines spacing metrics for each said glyph in said font except for said first glyph to said printer; and
        ii) downloading to said printer, a glyph data structure corresponding to said first glyph, said glyph data structure including spacing metric data for only said first font glyph; and
    b) responding to a requirement to download a further glyph of said font to said printer, by downloading a glyph data structure corresponding to said further glyph, said glyph data structure including spacing metric data for only said further glyph.

6. The method as recited in claim 5, wherein said spacing metric data comprises left side bearing and advance width data.

7. The method as recited in claim 6, wherein said font header data is devoid of left side bearing and advance width data for glyphs comprising said font.

8. The method as recited in claim 5, wherein said font memory stores TrueType font data which comprises contour descriptions of font glyphs.

* * * * *